Nov. 11, 1958 E. A. WEISS 2,859,772
HEAT CONTROL VALVE
Filed Dec. 7, 1954

INVENTOR.
ERWIN A. WEISS
BY
Wilson, Redrow, and Gaines
ATTORNEYS.

United States Patent Office 2,859,772
Patented Nov. 11, 1958

2,859,772

HEAT CONTROL VALVE

Erwin A. Weiss, Detroit, Mich., assignor to Studebaker-Packard Corporation, Detroit, Mich., a corporation of Michigan Application December 7, 1954, Serial No. 473,678

9 Claims. (Cl. 137—527.8)

The present application relates to motor manifold heat control valves for use on engines. More specifically it relates to a heat control valve for the exhaust manifold of a V-type automotive engine, for instance, a V-8 type automotive engine.

Motor manifold valves of the type under consideration are generally as shown in the expired Patent No. 1,998,636, for instance, and in essentials include a valve shaft, a butterfly valve disk eccentrically mounted thereto, and a return spring for closing the valve, the spring usually being made of flat, laminar thermostatic bi-metal material, for instance, composite brass and Invar strips. Due to the eccentric mounting of the butterfly disk, the valve is arranged to be opened by motor manifold exhaust pressure and is also arranged to be opened by the supplemental force of gravity. To this end, a weighted pendulum connected to the valve is disposed in an unstable at rest position so as to utilize its weight naturally to open the valve. During warm-up when the exhaust pressure of the engine is reduced, that is, when the engine throttle is closed the insufficiently warm bi-metal spring causes the valve to close suddenly and an objectionable slamming noise may be created due to the inertia of the moving weight of the pendulum. This weight which constantly acts to open the valve, is forcefully resisted by the bi-metal spring whenever the engine is cold and this resistance is particularly manifested during the infant stages of engine warm-up. Dependent to a degree on the magnitude of manifold exhaust pressure, a somewhat dynamically balanced condition is reached just before the valve begins its predetermined initial opening movement. During such dynamically balanced state of valve position, a resonant exhaust excited flutter of the butterfly disk may tend to arise resulting both in an oscillatory rotation of the valve and its shaft through a slight angular amplitude about its axis and in a slight oscillatory axial movement or displacement, and a vibratory noise tends to occur separate from the noted slamming noise. A flat type bumper spring engageable during the valve closed position has been found generally to largely eliminate the slamming noise and substantially reduce the excited oscillations of small amplitude about the axis of the valve shaft, but little has heretofore been done in the direction of eliminating the axial vibrations.

It is an object of the presently disclosed invention to eliminate the axial vibrations in a motor manifold heat control valve and to impose a dual function on the bumper spring of the same whereby it tends to eliminate both the rotary oscillations and the noise producing axial oscillations of the valve likely to occur, for instance during the transition stage of the valve in its engine warm-up movement.

It is another object of the invention to provide a counterweight carried bumper spring and a heat control valve counterweight mass in association therewith and so cast or machined as inherently to hold the bumper spring at an oblique angle to a reference axis such that the bumper spring engages a bumper stop in knife edged engagement to prevent axial shift of the spring and stop elements relative to one another and as well as to provide cushioned engagement between the two elements as they engage during their relative angular movement about such axis.

It is a further object of the invention to provide a cantilevered bumper spring for use with a valve structure around which it wraps as it deflects the bumper spring being angularly related thereto and to the bumper stop on which it bumps so as to stiffen as it is deflected at a higher than normal stiffening rate compared to normal, square engaging bumper springs. According to a feature of the invention, the angularly related bumper spring has a combined laterally deflecting or bending movement and a twisting movement, the latter tending to add to the stiffness thereof at a higher than unity power; making the spring stiffen as an exponential function of its deflection.

Further features, objects and advantages will either be specifically pointed out or become apparent when for a better understanding of the invention reference is made to the following written description taken in conjunction with the accompanying drawing, in which.

Figure 1:
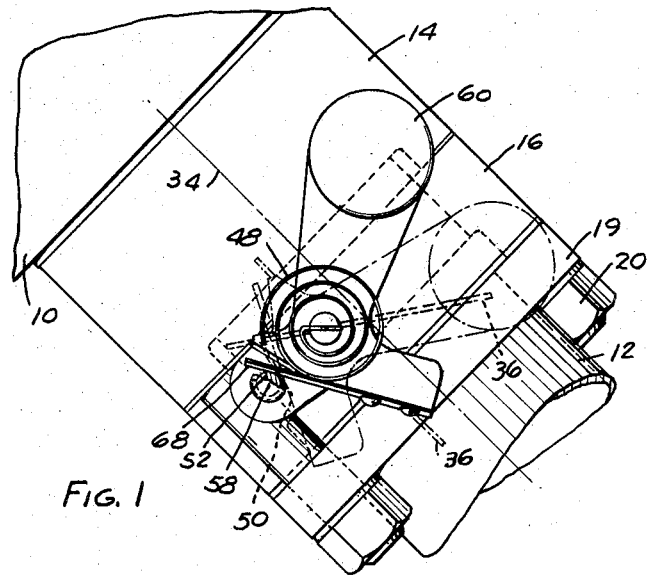
Figure 1 is a side elevational view of a motor manifold heat control valve assembly embodying the present invention.

In the drawing the motor manifold exhaust structure of an engine 10 is fragmentarily shown as having a conventional downwardly extending exhaust pipe 12 in association therewith. In the case of a V-banked eight cylinder engine, the exhaust pipe 12 will actually comprise only one of two similar exhaust pipes at the opposite engine sides and will serve only the bank of the engine at that side thereof. Between the manifold 10 and the exhaust 12 a short spacer pipe 14, which may be of a composition insulative material or else metal, coupled to a motor manifold valve body 16, provides a gas tight interconnection for conducting the exhaust gases away from the engine. The valve body 16 has a peripheral transverse flange 18 and is clamped at its lower flange surface to an attaching flange 19 on the exhaust pipe 12 by means of a plurality of stud and nut fasteners 20, the studs thereof being anchored in the manifold exhaust structure. The valve body 16 has a side extension portion 22 and is drilled out to incorporate a through bore extending through the extension portion 22 so as to receive a throttle valve shaft 24 set to rotate therein by means of a pair of axially spaced apart bearing bushings 26, 28 about a horizontally disposed axis 30. The valve body 16 has a throat 32 through which exhaust is conducted between the manifold 10 and the exhaust pipe 12 and in which the central axis as at 34 can be seen to be offset to the transverse shaft axis 30 to the extent that the latter is eccentric thereto. Accordingly, a butterfly type heat control valve 36 mounted to the shaft 24 is likewise rendered eccentric with respect to the throat 32 and the center of fluid pressure roughly at 34 thereon tends to open the butterfly valve 36 when exhaust fluid pressure from the manifold 10 creates a pressure differential thereacross.

Figure 4:
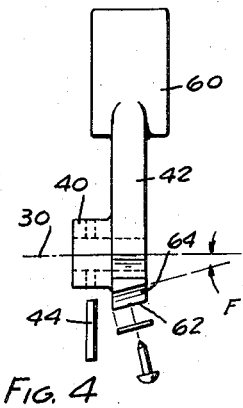
Figures 4 and 5 are side and face views of the bumper spring and the associated counterweight to which it is attached.
Figures 2, 3:
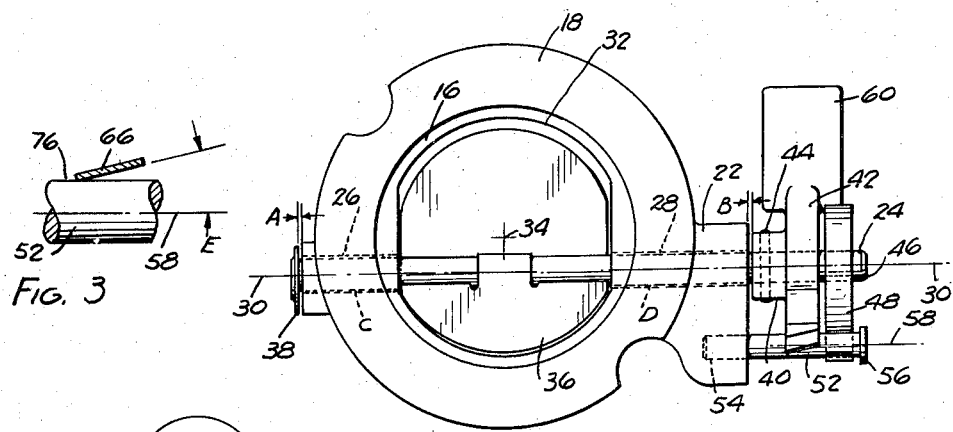
Figure 2 is a plan view of the valve assembly.
Figure 3 is a fragmentary view of a bumper spring and a bumper stop novelly employed in the valve assembly.
Figure 5:
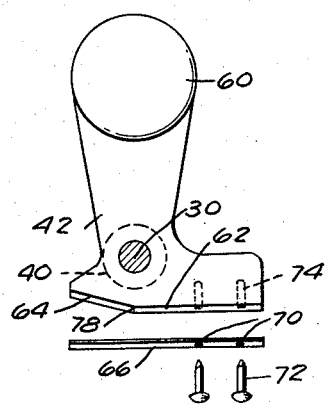

At one end, the valve shaft 24 is upset to provide a flattened head at 38 to retain the shaft against endwise shift in the valve body but an axial clearance for the head 38 as indicated at A may be provided by design so as to insure freedom of the valve shaft from binding. Adjacent the opposite end of the shaft 24 the hub 40 of a mass 42 is mounted and secured fast thereto for conjoint oscillatory rotation with the shaft about its axis and in an axial direction by means of a pin 44. The hub 40 may be designed to have an axial clearance as indicated at B from the end of the valve body extension 22 so as to insure a general freedom from binding between the valve shaft 24 and the valve body 16. Additionally, radial clearance may be provided at C and D between the shaft 24 and the respective valve body bushings 26, 28 in which the shaft is set to rotate, the resulting rotation thus being assured some degree of general freedom from binding. An end of the shaft 24 adjacent the mass 42 protrudes from the latter and is formed with a bifurcation producing slot 46 in which the moving inner end of an anchored bi-metallic coil spring 48 is received. The moving or inner end of the spring 48 and also the mass 42 moves concentrically about the shaft axis 30 and the outer or anchored end of the spring 48 is reversely bent on itself at its extreme portion 50 to loop around a horizontally disposed cylindrical pin stop 52 which is received in an interference fit within an anchoring bore 54 in the valve body extension 22 so as to be rigidly retained in place. The pin stop 52, the anchored end of which may be formed with flute-like straight knurling about its girth and which may have a flatted head 56 at its opposite or free extremity, has an axis 58 in parallelism to but spaced apart from the horizontal axis of the shaft 30 in a common transverse plane in which they are contained and which is normal to the longitudinal axis 34 of the valve body. The hub 40 for the mass 42 is bored out in two mutually perpendicular directions for receiving the valve shaft 24 and the keying pin 44 also formed the structural juncture for a pair of mutually perpendicular arm portions comprising the rest of the mass 40. One arm portion is indicated at 60 and integrally incorporates a laterally thickened inertia weight cylinder at the extremity which is gravity operated and which also performs the added function of that of an inertia pendulum or flywheel for the valve shaft 26. The other arm of the mass 42 has a pair of first and second successive flat portions or surfaces at 62, 64 which are cast or machined thereupon and which cooperate in different fashions with a flat cantilever bumper spring 66 whose cantilever or free portion at 68 has a path of arcuate movement such that it engages the pin stop 52. The pin stop 52 thus occupies a position in the path of movement of the bumper spring that is at 90° angularity or transversity thereto. The base of the attaching portion of the flat bumper spring is formed with a pair of lengthwise spaced apart openings 70 through which two retaining rivets 72 are passed to be received in a like number of interferingly fitting sockets 74 in the mass 42 in which they are anchored at their bases to hold the attaching base portion of the spring 66 juxtaposed to and parallel with the arm surface 62. The plane of the surface 62 and the plane of the parallel spring 66, Figure 3, are such that the cantilever portion of the spring 66 engages the stop 52 in an initial knife edged angle of engagement as at 76 and forming an angle E with respect to the horizontal axis 58 for the pin stop 52. The fact that the exterior of the stop member 52 is a cylindrical surface which closes on itself, added to the fact that the free portion 68 of the spring is disposed bodily diagonal to its arcuate path of movement so as to expose a sharp cornered leading knife edge, results in the engagement between members being only a single point highly stressed contact. The plane of the other flat portion 64 of the mass 42 forms another and greater angle indicated at F, Fig. 4, with respect to the shaft horizontal axis 30 which, as already noted, is parallel to the pin axis 58. When the cantilever portion 68 of the flat spring 66 backs up against the higher angled, more greatly relieved surface 64 in extreme travel movement of the mass 42, the cantilever portion twists to assume an angle different from the angles E and F with respect to the axes 30 and 58, and less than either. Moreover no solid bottoming of the spring portion 68 occurs against the relieved back-up surface 64, but, owing to their differences of relative angularity, only line contact results. In the preferred form of the invention the desirability becomes apparent for having the line of juncture or demarcation indicated at 78, Figure 5, between the two surfaces 62 and 64 exactly transverse to the longitudinal length of the cantilever spring 66 to provide for a uniformly acting fulcrum or bending point for the spring which thus twists as it bends. In other words, the cantilever portion 68 of the spring 66 initially engages the stop 52 at an acute angle E such that the cantilever portion not only deflects toward the surface 64 as it bends but also twists somewhat imperceptibly due to the eccentricity of its sharp cornered side of engagement 76 with the stop 52. The stiffness of this cantilever portion increases as a power of the magnitude of deflection thereof and becomes progressively stiffer as the valve 36 and the mass 42 swing back toward the closed position of the former whereupon the spring 66 engages the pin stop 52. The knife edged engagement at 76, Figure 3, concentrates pressure to yield a high coefficient of friction to prevent relative axial displacement between the spring 66 and the stop 52 while they are engaged, and thus substantially reduces or largely eliminates shaft rattle in an axial direction within the bushings 26, 28. The non-linearly changing stiffening rate of the spring 66 varying with the amplitude of deflection tends rapidly also to damp out oscillatory vibrations of the shaft 24 and accordingly a much quieter valve operation results particularly during the transition state of engine warm-up in an engine to which the valve is fitted.

The invention may be readily modified in regard to the angularly related spring engaging flats 62, 64 on the mass 42.

Figure 6:
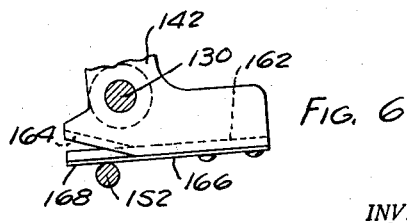
Figure 6 is a modified showing of the invention.

In Figure 6 a modified form of the invention is shown wherein the first and second successive flat surfaces on a mass 142 are in fact arranged such that the surfaces are inclined in an opposite direction from but at the same magnitude of angularity as the counterpart surfaces of the preceding embodiment. Thus in Figure 6 a first spring attaching surface at 162 and a spring 166 attached thereto form a positive or clockwise angle to the horizontal corresponding to the counter-clockwise acute angle E of Figure 3 measured negatively from the axis 58. A second portion or flat surface at 164, Figure 6, forms an acute angle with the axis 130 of the mass 142 which is measured in a positive or clockwise direction compared to the counter-clockwise disposition of the angle F, Figure 4, with respect to the counterpart axis 30 of the preceding embodiment. The high pressure angle of contact between the cantilever portion 168 of the spring 166 and the stop 152 is shown at 176.

A common feature to the preceding embodiments of the invention is that the single point knife edged engagement between one sharp cornered edge of the spring 66 and an adjacent portion of the stop 52, for instance, results in a high concentration of stress giving rise to an extremely high coefficient of friction as between the two members involved. Accordingly, relative movement of the spring and its associated structure in an axial direction of the stop 52 is substantially reduced, if not largely or completely eliminated.

The following is given as an example of the clearances and angularities between the elements specified in the foregoing control valve assembly.

Axial clearance between shaft head and valve body at A: .007–.012 inch.

Axial clearance between hub and valve body extension at B: .007–.012 inch.

Diametrical clearance shaft to bearing bushing at C: .007–.009 inch loose.

Diametrical clearance shaft to bushing at D: .007–.009 inch loose.

Angularity of attachment flat and spring to horizontal axis at E: 12°.

Angularity of relieved backing flat to horizontal axis at F: 25°.

As herein disclosed the valve assembly of the present invention is shown to incorporate a flat bi-metallic coil return spring. It is evident that a helically wound spring or other torsion spring, whether flat or otherwise may be employed to equal advantage in certain applications. So also the drawing shows that the pin stop 52, in addition to its bumper stop and anti-rattle functions, also acts as the anchor for the fixed looped end of the bi-metal coil return spring but self-evidently a separate anchor may instead be provided for the return spring. Self-evidently, the attachment and back-up surfaces for the bumper spring may execute equiangular intersections with their horizontal reference axes rather than being of different angularities as disclosed at E and F respectively. The function of a combined inertia flywheel and gravity operated weight is consolidated in one member 42 of the present disclosure but indeed it is not essential that a single member be employed and in certain installations it may be found desirable to have a separate inertia flywheel keyed to the valve shaft in addition to providing an individual gravity operated pendulum or weight for opening the same.

Variations within the spirit and scope of the invention described are equally comprehended by the foregoing description.

What is claimed is:

1. In an exhaust pipe control valve, a spring returned butterfly valve shaft oscillatable about its axis and capable of limited movement along said axis, a combined inertia and gravity weight member fast to said shaft having an arm formed with a flat surface of which the plane of the flat is disposed to said axis at an angle of the order of 25 degrees, a stationary stop disposed parallel to said axis in adjacency to the member, and an anti-rattle flat bumper spring engageable with the stop and secured to the member in parallel juxtaposition to the plane of said flat.

2. In combination, a control shaft oscillatable about its axis and capable of limited movement along said axis, a pivotally moveable member fastened to said shaft having an arm formed with a surface of which the plane is disposed at an angle of the order of 25 degrees to said axis, and a flat bumper spring engageable with stationary means and secured for movement with said member in parallel juxtaposition to said plane.

3. In a heat control valve assembly having a stationary member and a shaft-mounted member set in bearings therein to oscillate about the shaft axis and capable of limited movement along said axis, the combination of motion limiting parts engageable with one another and having integral attaching portions for attachment of the same to the respective stationary and oscillatable members, said parts having a transverse disposition with respect to one another with one part diagonally disposed at an angle of the order of 25 degrees to its own path of movement so as to engage the other part initially along an edge only.

4. In a control assembly having case and valve members, case-and-valve-connected parts relatively movable with respect to and directly engageable with one another, one of said parts being flexible and being bodily disposed diagonally at an angle of the order of 25 degrees with respect to their path of relative movement, another of said parts being stiff and disposed substantially transversely normal to their path of relative movement.

5. In a valve assembly, a combined inertia and gravity weight mounted for oscillatable movement about an axis and capable of limited displacement in a direction along said axis, said weight having an arm formed with a flat surface of which the plane of the surface is disposed at an angle of the order of 25 degrees to said axis, and a flat bumper spring engageable with a stationary stop and secured to said weight in parallel juxtaposition to said plane.

6. Mechanism including first and second parts which have opposing surfaces and which are relatively movable to one another about a fixed reference axis, the just said surface of the first part being formed flat on an arm thereof so as to define a plane to which said axis is disposed at an angle of the order of 25 degrees, and in combination therewith, means having a base for attachment to a surface of one of the parts aforesaid and engageable with the counterpart surface of the other in single point contact of engagement during extreme relative movement of the parts with respect to one another.

7. In combination, a valve shaft oscillatable about its axis and capable of limited movement along said axis, a pivotally moveable gravity weight fastened to said shaft and having a portion formed with a spring attachment surface, a stationary stop adjacent the weight, and an anti-rattle bumper spring attached to the attachment surface of the weight portion at an angle to the stop, said angle being sufficient so that said spring is obliquely engageable with said stop in knife edged contact during pivotal movement of said weight after said spring contacts said stop.

8. In a manifold heater valve assembly, a spring returned valve shaft oscillatable about its axis, a pivotally moveable combined inertia and gravity weight fastened to said shaft having an arm provided with a flat surface thereon being at an angle with respect to said axis, a stationary stop adjacent the weight, a flat bumper spring secured to said flat surface, said angle being of sufficient size so that said spring is engageable with the stop in knife edged contact therewith during a substantial pivotal movement of said weight after said spring contacts said stop.

9. In combination, a butterfly valve, a shaft for supporting said valve and oscillatable therewith about the shaft axis and capable of limited movement along said axis, a pivotally moveable inertia weight fastened to said shaft having an arm formed with successive planar portions whose planes are mutually obtuse to one another and independently acute to the shaft axis, a position-limiting flat bumper spring secured to the inertia weight in permanent contact with one of said successive portions at an angle with respect to said axis, and a fixed stop in the path of movement of the bumper spring, said angle being of sufficient size so that said spring is engageable with an edge of said spring during a substantial part of the movement of said weight after said spring contacts said stop to deflect one portion of said spring into intermittent bottoming engagement with the other of said successive portions on the weight arm.

References Cited in the file of this patent

UNITED STATES PATENTS

| | | |
|---|---|---|
| 2,169,321 | Jones | Aug. 15, 1939 |
| 2,564,112 | Kittler | Aug. 14, 1951 |